United States Patent [19]

Agarwal et al.

[11] 4,399,096
[45] Aug. 16, 1983

[54] HIGH TEMPERATURE BRAZING ALLOYS

[75] Inventors: Dwarika P. Agarwal, Williamsville; Clyde E. Ingersoll, Tonawanda, both of N.Y.

[73] Assignee: Williams Gold Refining Company Incorporated, Buffalo, N.Y.

[21] Appl. No.: 385,700

[22] Filed: Jun. 7, 1982

[51] Int. Cl.$^3$ .................. C22C 30/00; C22C 5/04; C22C 19/03
[52] U.S. Cl. .................................. 420/463; 420/580
[58] Field of Search ............................... 420/463, 580

[56] References Cited

U.S. PATENT DOCUMENTS

| | | | |
|---|---|---|---|
| 2,123,330 | 7/1938 | Feussner et al. | 420/463 |
| 2,815,282 | 12/1957 | Rhodes et al. | 420/463 |
| 3,070,875 | 1/1963 | Feduska | 420/580 |
| 3,277,150 | 10/1966 | Rhys et al. | 420/463 |
| 3,597,194 | 8/1971 | Savage et al. | 420/580 |
| 3,928,913 | 12/1975 | Schaffer | 420/463 |
| 4,149,814 | 4/1979 | D'Silva | 420/444 |
| 4,169,744 | 10/1979 | D'Silva | 148/427 |
| 4,179,286 | 12/1979 | Knosp | 420/463 |
| 4,179,288 | 12/1979 | Prosen | 420/463 |
| 4,261,744 | 4/1981 | Boyajian | 420/463 |

FOREIGN PATENT DOCUMENTS

| | | |
|---|---|---|
| 1269389 | 12/1961 | France . |
| 1375498 | 2/1965 | France . |
| 38-4757 | 7/1963 | Japan . |
| 886591 | 1/1962 | United Kingdom . |

*Primary Examiner*—W. Stallard
*Attorney, Agent, or Firm*—Christel, Bean & Linihan

[57] ABSTRACT

A brazing alloy composition for joining chromium containing base metal alloys containing, by weight, palladium about 39%–60%, nickel about 20%–47.5%, and at least one element selected from the group consisting of silver 0–35%, tin 0–32%, indium 0–32% and gallium 0–11%; and optionally containing one or more elements selected from the group consisting of gold 0–10%, germanium 0–4.4%, silicon 0–2.9% and about 0.025% of a known deoxidizer such as lithium. The alloy exhibits good wetting and flowing characteristics and has excellent strength and corrosion resistance at elevated temperatures. The brazing alloy is particularly useful for joining chromium containing baese metal alloys of the type which are used in the porcelain-fused-to-metal technic in dental prosthetics.

12 Claims, 1 Drawing Figure

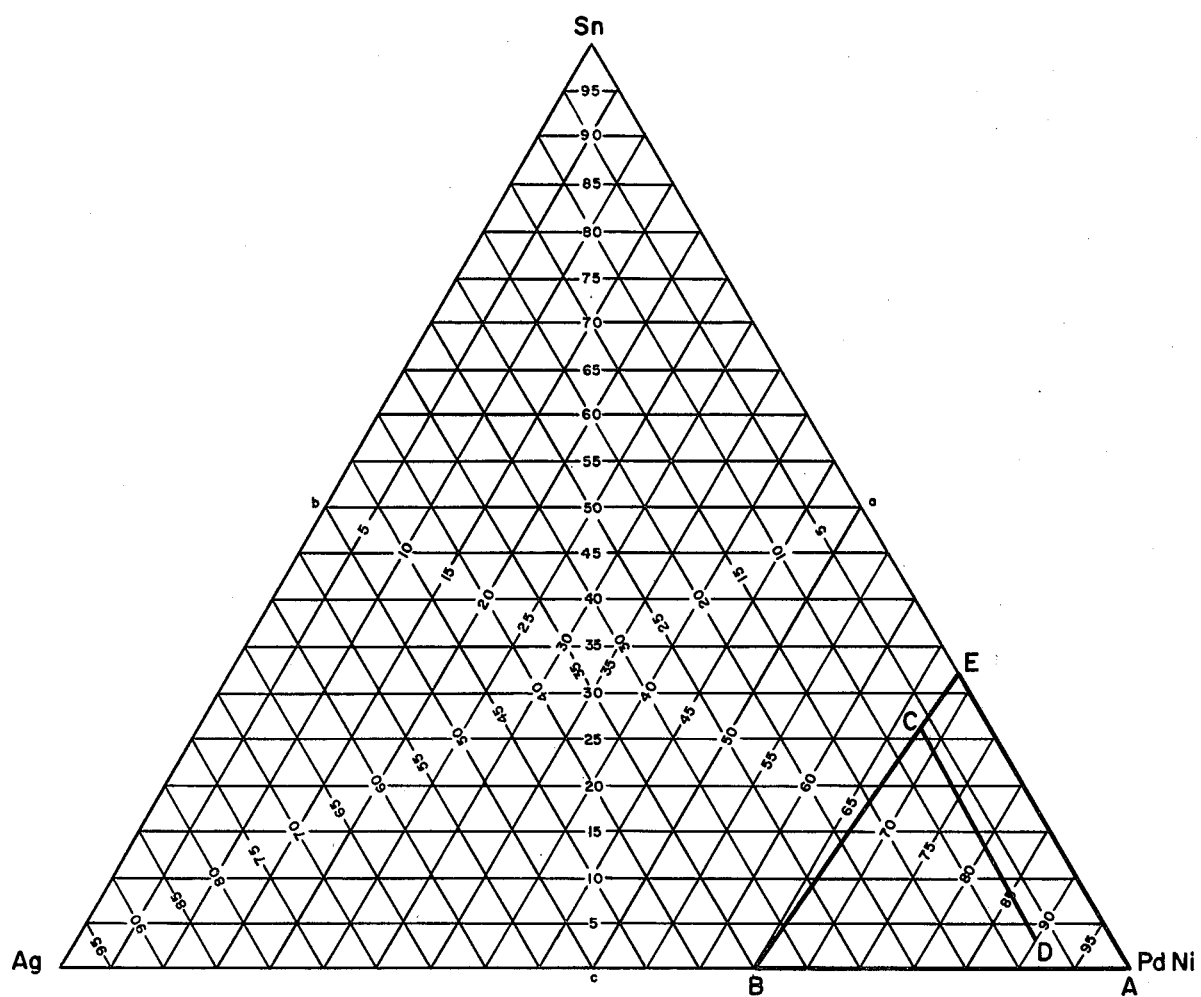

HIGH TEMPERATURE BRAZING ALLOYS

BACKGROUND OF THE INVENTION

This invention relates to the art of metal alloys, and more particularly to a new and improved brazing alloy for joining chromium containing base metal alloys used in high temperature environments.

Chromium containing base metal alloys were originally developed for use in the fabrication of components for aircraft engines as a result of the need for alloys having optimum high temperature mechanical strength and corrosion resistance. In recent years these alloys have been used successfully in other high temperature industrial applications and have acquired considerable importance in dentistry for porcelain-fused-to-metal restorations, primarily due to the greater cost of gold and other precious metals.

Chromium, which is present in a substantial proportion by weight in these alloys, enhances the corrosion and tarnish resistance of the alloy. Nickel, the element present in a major proportion by weight, is employed not only for its resistance to corrosion but also because it serves as a good host for the chromium. A good host material for chromium is necessary to enable the alloy to be utilized in precision casting. In particular, of the three known bases for chromium in alloys of this general type, i.e. cobalt, iron or nickel bases, nickel is preferred because it provides better workability of the resulting alloy, a lower melting temperature of the alloy, and greater precision of casting as compared to the other two bases.

The brazing or soldering (as it is commonly known in dental terminology) of such base metal alloys, particularly those of the nickel-chromium type, has always presented numerous difficulties. This is true, not only in dentistry, but in other industries as well.

In the past, platinum group metal alloys and combinations of gold, platinum and palladium have been used for dental applications where porcelain is to be fired on the soldered parent metal after soldering has taken place. Gold and platinum containing brazing alloys are too expensive to use where nickel-chromium parent alloys are used for their low cost. In addition, gold in a brazing alloy can alloy by diffusion with the parent metal and the resulting gold-nickel alloy will fuse or melt at about 950° C. (1740° F.) causing the soldered bridge to sag when porcelain is later applied to the casting by fusion up to about 980° C. (1800° F.).

When nickel-chromium base solders are employed to join nickel-chromium parent alloys, additional problems arise. These problems are related to the strong tendency of both the brazing and parent alloys to oxidize during heating to the brazing temperature. The oxide formed is so refractory and so protective that a joint can only be made under very stringent conditions with a very strong flux. If the pieces to be joined and the brazing filler metal are not protected from oxidation by atmosphere control or proper torch flame during heating, no amount of flux will clean away the oxide sufficiently to make a perfectly brazed joint. If flux is used during heating to protect from oxidation, the nickel-chromium filler metals may lack the fluidity and wetting capability to displace the flux without mixing with it.

Various heat resistant non-gold precious metal alloy systems comprising palladium and nickel as the predominent elements have been developed in an attempt to provide an improved soldering alloy which would overcome the foregoing difficulties, however, none of these compositions have been entirely successful. For example, U.S. Pat. No. 2,815,282 discloses a nickel-palladium-manganese alloy containing from 16%–40% manganese. Due to the amount of manganese present, the resulting alloy has reduced tarnish and corrosion resistance and exhibits increased oxide formation. U.S. Pat. No. 3,070,875 discloses a nickel-palladium alloy combined with up to 3.5% of either silicon or beryllium. Again, the alloy produced is unsatisfactory due to its significantly decreased melting temperatures and hot shortness. In addition, the silicon has the potential to lower the solidus to 800° C. (1470° F.) U.S. Pat. No. 3,277,150 and French Pat. No. 1,375,498 disclose adding about 2% to about 9% of titanium to the nickel-palladium. However, this combination results in excessive refractory oxide formation which is difficult to avoid or remove. U.S. Pat. No. 3,597,194 discloses a nickel-palladium-zirconium alloy developed specifically for its brittleness making it suitable for comminution into a powder form.

Although the disclosure which follows deals specifically with a new brazing alloy composition for dental use, it is to be understood that such compositions will have particular significance in many other industries where it is desirable to successfully solder or braze base metal alloys which are exposed to high temperature and high corrosion environments.

SUMMARY OF THE INVENTION

It is, therefore, a primary object of the present invention to provide a new and improved brazing alloy for joining chromium containing base metal alloys.

It is a further object of this invention to provide such an improved brazing alloy having sufficient strength to withstand subsequent heating to high temperatures without undergoing any significant distortion or sagging.

It is a further object of this invention to provide such an alloy having a bond strength comparable to the strength of the parent metal.

It is a further object of this invention to provide such an alloy having the ability to become molten in the proper temperature range.

It is a further object of this invention to provide such an alloy having sufficient flow characteristics, namely the ability to flow below the solidus temperature of the parent metal.

It is a further object of this invention to provide such an alloy having sufficient fluidity to completely displace the flux coating without mixing with the flux.

It is a further object of this invention to provide such an improved brazing alloy which does not readily alloy with the parent metal to form a lower melting alloy.

It is a further object of this invention to provide such an alloy having little or no porosity in the soldered area.

It is a further object of this invention to provide such an alloy which is as tarnish and corrosion resistant as the parent alloy.

It is a further object of this invention to provide such an alloy which can provide a strong connection between two chromium containing castings.

It is a further object of this invention to provide such an alloy having the ability to properly wet chromium containing base metal alloys of the type which are used in the porcelain-fused-to-metal technic in dental prosthetics. It is a further object of this invention to provide such an alloy having a solidus temperature above the temperature used to fire porcelain on the parent metal.

It is a further object of this invention to provide such an alloy having good porcelain compatibility.

It is a further object of this invention to provide such an alloy having thermal expansion and contraction characteristics compatible with porcelain.

It is a further object of this invention to provide such an alloy having the ability to withstand the corrosive conditions of the mouth.

It is a further object of this invention to provide such an alloy having sufficient mechanical strength to withstand the masticatory forces of the mouth.

It is a further object of this invention to provide such an alloy which does not cause the discoloration of porcelain when it is fired onto a brazed joint formed between two chromium containing dental castings.

The present invention provides an improved brazing alloy incorporating the following ranges of constituents in percentages by weight: palladium 39%–60% and nickel 20%–47.5% as the major alloying elements and at least one element selected from the group consisting of silver 0–35%, tin 0–32%, in dium 0–32% and gallium 0–11%, and optionally, one or more elements selected from the group consisting of gold 0–10%, germanium 0–4.4% and silicon 0–2.9%, along with trace amounts of known additives and incidental impurities. The brazing alloy of the present invention possesses enhanced wetting and flowing characteristics at brazing temperatures and exhibits good mechanical strength at elevated service temperatures.

BRIEF DESCRIPTION OF THE DRAWING

The FIGURE is a pseudo-ternary diagram showing the relationships existing between the elements nickel, palladium, silver and tin within the preferred composition ranges claimed.

DETAILED DESCRIPTION OF THE PREFERRED EMBODIMENTS

This invention is directed to improved brazing alloy compositions suitable for use in an elevated temperature environment, wherein the base members to be joined are of the chromium containing type such as those used in dental prosthetics. Broadly, the brazing alloy of this invention is essentially free from incidental impurities and contains, by weight, palladium 39%–60%, nickel 20%–47.5% and at least one element selected from the group consisting of silver 0–34%, tin 0–32%, indium 0–32% and gallium 0–11%; and optionally one or more elements selected from the group consisting of gold 0–10%, germanium 0–4.4% and silicon 0–2.9%; combined with trace amounts of known additives such as deoxidizers, grain refiners and the like normally used for such purposes.

Preferred brazing alloy compositions are those which contain, by weight, palladium 39%–60%, nickel 20%–47.5%, silver 3.2%–35% and at least one additional element selected from the group consisting of tin 0–31.6%, indium 0–18.7% and gallium 0–11%; and optionally one or more elements selected from the group consisting of gold 0–10%, germanium 0–4.4% and silicon 0–2.9%; along with trace amounts of known additives such as deoxidizers, grain refiners and the like normally used for such purposes.

A still more preferred composition, according to this invention, contains palladium 39%–60%, nickel 20%–47.5%, silver 3.2%14 35% and tin 0.3%–31.6% wherein as the amount of silver decreases, the amount of tin increases and the total combined amount of both silver and tin is at least 3.5%.

An especially useful alloy composition within the broad range of constituents, according to this invention, contains about 53.5% palladium, about 35.6% nickel, about 7.1% silver, about 3.8% tin and about 0.025% of a known deoxidizer.

The successful soldering alloy for dental applications must exhibit satisfactory wetting and flowing characteristics, and must have sufficient mechanical strength and corrosion resistance at elevated temperatures. In particular, the solidus temperature of the brazing alloy must be higher than the temperature at which porcelain is fired onto the casting. One particular porcelain used for this purpose is normally fired at about 1800° F. Accordingly, the joining alloy would require a solidus temperature above 1800° F. if it were to be used in conjunction with this particular porcelain. Moreover, the brazing alloy has to have a liquidus temperature below the solidus temperature of the parent metal used in the castings to enable the soldering operation to be carried out without detriment to the casting members being joined. It is not unusual for such a parent composition to have a solidus temperature of about 2425° F. Consequently, the brazing alloy must flow below this temperature.

While combinations of palladium and nickel alone could fulfill some of the aims of this invention with respect to melting temperature, the alloy produced by this combination would lack the enhanced flow properties which are characteristic of the brazing alloy formulated according to this invention. Moreover, such a binary composition produces a brazing alloy having a melting range which is too high (2200° F.–2230° F.) for use with nickel-chromium alloys containing beryllium. The use of beryllium in nickel-base alloys has become very popular because beryllium increases the castability and lowers the melting range of the parent alloy making it easier to melt and cast. Ideally, a high temperature brazing alloy for use with such beryllium containing alloys should have a melting range from about 1810° F.–2185° F., and more preferably between 1950° F.–2110° F.

It has now been discovered that certain specific elements when added to nickel-palladium base alloy systems result in an alloy having a lower melting temperature than normally expected with combinations of nickel and palladium alone. Moreover, it has further been discovered that these certain specific elements added to nickel-palladium alloys will produce an even greater effect on the lowering of the melting temperature of the resultant alloy than would be expected from adding these specific elements individually.

Referring now to the drawing FIGURE, point A, which in a normal ternary would represent 100% of a single element, is an alloy of palladium and nickel where the palladium is equal to from about 0.9–3.0 times the amount of nickel. Line A-B is part of a simple ternary of siliver-nickel-palladium where silver is contained up to about 35%. Line A-E is part of a simple ternary of nickel-palladium-tin where tin is contained up to about 32%. The triangle A-B-E is the section of the pseudoternary of interest. Along the line B-E and along any other parallel line to B-E within the triangle, as the amount of silver decreases, the amount of tin increases and vice versa in the reverse direction. Line C-D is in effect a valley where the solidus temperatures of alloy combinations near this line (C-D) have lower values than those occurring along lines A-B and A-E. In other words, specific combinations of silver and tin added to the palladium-nickel alloy produce a new alloy system having melting temperatures which are lower than those produced by the addition of either silver or tin alone.

The addition of silver to nickel containing alloys has generally been avoided in the prior art except where one or the other of these elements are present in only minor amounts. For example, British Pat. No. 886,591 discloses an alloy composition wherein the silver content is limited to not more than 5%. The reason for such limitation is the general immiscibility of liquid silver with liquid nickel and the inability of liquid silver to sufficiently wet solid nickel. However, it has now been discovered that the combination of palladium, nickel and silver allows considerably more silver to be used and neither problem results. Moreover, the presence of the silver lowers the solidus (and liquidus) from the high palladium-nickel value. Furthermore, the resulting silver-nickel-palladium alloy will not diffuse readily into the nickel-chromium alloys, has improved fluidity and wetting ability, does not oxidize and is corrosion resistant. As a result, the silver-palladium-nickel alloy composition produces a soldering alloy which is less sensitive to variations in technic which serves as an aid to dental technicians having ordinary skill.

Where silver is added as the sole ingredient to the palladium-nickel alloy, it is recommended that the silver be present in an amount from between 3.2%-35% and preferably from between about 4.8%-35% by weight of the total alloy composition. In general the most preferred alloy compositions are those wherein the silver is present in an amount above 6.0% of the total composition.

When tin is added as the sole ingredient to the palladium-nickel mixture, it is recommended that tin be incorporated in an amount preferably between about 4.4%-31.6%. Tin lowers the solidus (and liquidus) without producing hot shortness. It aids in wetting and does not form a difficult oxide. In addition the presence of tin helps to improve the tarnish and corrosion resistance of the resulting alloy.

The most preferred alloy system, according to this invention, will contain a combination of silver and tin. As mentioned above, when both elements are combined with the nickel-palladium mixture, the resulting alloy will have a lower melting temperature than could be produced by the addition of either silver or tin alone. Furthermore, the relationship between the amount of silver and tin utilized is such that as the amount of silver present in the alloy decreases, the amount of tin increases and vice versa. The total combined amount of silver and tin should be at least 3.5% by weight and preferably between about 4%-30% by weight of the total alloy.

The drawing FIGURE represents the temperature lowering effect of various amounts of silver and tin on nickel-palladium alloys. However, it has also been discovered that other specific elements, when added to nickel-palladium alloys, may have a similar, although less pronounced effect on the nickel-palladium melting point. For instance, it has been shown that indium can be substituted either partially or totally for the tin. As a result of using indium, the new alloy composition exhibits higher solidus and liquidus temperatures which temperatures increase as a direct effect of the amount of indium added. When the indium is substituted for relatively small amounts of tin up to about 3.5%, there exists an apparent 1:1 substitution relationship. However, at higher levels, relatively more indium will be required to produce the same degree of temperature lowering as that produced by tin alone.

Although not preferred, it is also contemplated, as within the scope of this invention, to replace both the silver and tin with indium. When indium is used alone as the sole additive to the nickel-palladium mixture, the minimum amount required is about 6% by weight of the total. Indium possesses the same attributes as tin and also improves the fluidity of the resulting soldering alloy.

Similarly, gallium may be used either as a complete replacement or a partial replacement for the silver and/or tin. When used as the sole additive to the palladium-nickel mixture, the minimum amount of gallium required is about 3.5% by weight. Gallium may also be used as a partial substitute for the silver and/or the tin although it is not as effective, as it lowers the solidus too rapidly.

In addition, various other elements i.e. namely gold, germanium and silicon may be used as optional, partial substitutes for the silver and/or the tin, but such substitutions do not produce soldering alloys having all of the beneficial properties as those produced by alloys containing palladium-nickel in combination with silver and tin. The substitution of gold, although effective, is undesirable due to economic factors. Furthermore, the use of pure silicon with palladium and nickel is also undesirable as it would produce an alloy having hot shortness and an increased tendency to fracture.

The brazing alloys of the present invention are made according to standard melting procedures and may be formed into strips, wires or rods. Alternatively, the brazing alloys may be produced as a powder which may be supplied to technicians either alone or in combination with a paste flux.

The brazing alloys, according to this invention, are illustrated further by the following EXAMPLES 1-74 set out below in Table I, giving the composition of each alloy, together with its melting range. All of the alloy compositions illustrated were made by known induction melting procedures.

TABLE I

| Example | Pd | Ni | Ag | Sn | In | Others | Melting Range °F. |
|---|---|---|---|---|---|---|---|
| 1 | 53.9 | 35.9 | 10.2 | | | | 2060-2150 |
| 2 | 52.4 | 34.9 | 12.7 | | | | 2030-2120 |
| 3 | 50.9 | 33.9 | 15.2 | | | | 2030-2115 |
| 4 | 49.5 | 32.9 | 17.6 | | | | 2020-2120 |
| 5 | 48.2 | 32.1 | 19.7 | | | | 2020-2120 |
| 6 | 46.9 | 31.2 | 21.9 | | | | 2020-2125 |
| 7 | 45.7 | 30.4 | 23.9 | | | | 2020-2125 |
| 8 | 44.6 | 29.7 | 25.7 | | | | 2020-2130 |
| 9 | 60.0 | 20.0 | 20.0 | | | | 2040-2125 |
| 10 | 50.0 | 25.0 | 25.0 | | | | 2020-2105 |
| 11 | 45.0 | 27.5 | 27.5 | | | | 2000-2120 |
| 12 | 40.0 | 30.0 | 30.0 | | | | 1970-2150 |
| 13 | 47.5 | 47.5 | 5.0 | | | | 2100-2210 |
| 14 | 45.0 | 45.0 | 10.0 | | | | 2090-2190 |
| 15 | 42.5 | 42.5 | 15.0 | | | | 1980-2180 |
| 16 | 40.0 | 40.0 | 20.0 | | | | 1980-2180 |
| 17 | 45.9 | 30.6 | 23.5 | | | | 2030-2130 |
| 18 | 43.3 | 28.9 | 27.8 | | | | 2030-2150 |
| 19 | 41.0 | 27.4 | 31.6 | | | | 2020-2130 |
| 20 | 39.0 | 26.0 | 35.0 | | | | 2000-2120 |
| 21 | 55.6 | 37.0 | 7.4 | | | | 2050-2180 |
| 22 | 57.1 | 38.1 | 4.8 | | | | 2060-2180 |
| 23 | 54.5 | 36.4 | 9.1 | | | | 2050-2150 |

TABLE I-continued

| Example | Pd | Ni | Ag | Sn | In | Others | Melting Range °F. |
|---|---|---|---|---|---|---|---|
| 24 | 57.4 | 38.2 | | 4.4 | | | 2085–2185 |
| 25 | 56.5 | 37.7 | | 5.8 | | | 2060–2165 |
| 26 | 55.7 | 37.2 | | 7.1 | | | 2050–2150 |
| 27 | 54.9 | 36.6 | | 8.5 | | | 2045–2130 |
| 28 | 53.4 | 35.6 | | 11.0 | | | 2030–2110 |
| 29 | 50.6 | 33.8 | | 15.6 | | | 2055–2080 |
| 30 | 48.1 | 32.1 | | 19.8 | | | 2060–2065 |
| 31 | 45.8 | 30.6 | | 23.6 | | | 2060–2065 |
| 32 | 41.0 | 27.4 | | 31.6 | | | 2020–2040 |
| 33 | 54.8 | 36.4 | 7.3 | 1.5 | | | 3055–2150 |
| 34 | 53.9 | 35.9 | 7.2 | 3.0 | | | 1990–2130 |
| 35 | 53.1 | 35.4 | 7.1 | 4.4 | | | 1970–2115 |
| 36 | 53.5 | 35.6 | 7.1 | 3.8 | | | 1950–2110 |
| 37 | 53.2 | 35.4 | 3.2 | 8.2 | | | 1950–2100 |
| 38 | 51.4 | 34.3 | 6.3 | 8.0 | | | 1930–2090 |
| 39 | 49.9 | 33.3 | 9.1 | 7.7 | | | 1930–2075 |
| 40 | 51.6 | 34.4 | 6.9 | 7.1 | | | 1940–2080 |
| 41 | 50.2 | 33.4 | 6.7 | 9.7 | | | 1930–2070 |
| 42 | 48.8 | 32.5 | 6.5 | 12.2 | | | 1930–2060 |
| 43 | 47.6 | 31.6 | 6.3 | 14.5 | | | 1930–2080 |
| 44 | 46.3 | 30.8 | 6.2 | 16.7 | | | 1910–2060 |
| 45 | 45.2 | 30.1 | 6.0 | 18.7 | | | 1940–2080 |
| 46 | 44.1 | 29.3 | 5.9 | 20.7 | | | 1980–2140 |
| 47 | 43.1 | 28.6 | 5.7 | 22.6 | | | 1960–2080 |
| 48 | 42.0 | 28.0 | 5.6 | 24.4 | | | 1930–2040 |
| 49 | 54.9 | 36.6 | | | 8.5 | | 2040–2090 |
| 50 | 53.5 | 35.6 | 7.1 | | 3.8 | | 2060–2120 |
| 51 | 48.8 | 32.5 | 6.5 | | 12.2 | | 2050–2110 |
| 52 | 45.2 | 30.1 | 6.0 | | 18.7 | | 2060–2150 |
| 53 | 53.4 | 35.6 | 7.1 | 1.0 | 2.9 | | 1980–2065 |
| 54 | 49.6 | 32.7 | 7.1 | 1.0 | 9.6 | | 1930–2075 |
| 55 | 49.6 | 32.7 | 7.1 | 1.0 | | Au 9.6 | 1990–2100 |
| 56 | 54.8 | 36.4 | 7.3 | | | Ga 1.5 | 2010–2150 |
| 57 | 53.9 | 35.9 | 7.2 | | | Ga 3.0 | 1980–2130 |
| 58 | 53.1 | 35.4 | 7.1 | | | Ga 4.4 | 1930–2115 |
| 59 | 52.4 | 34.8 | 7.0 | | | Ga 5.8 | 1835–2100 |
| 60 | 54.1 | 36.0 | 7.2 | | | Ge 2.7 | 1940–2105 |
| 61 | 53.1 | 35.4 | 7.1 | | | Ge 4.4 | 1850–2030 |
| 62 | 54.8 | 36.4 | 7.3 | | | Ge 1.5 | 1955–2140 |
| 63 | 53.9 | 35.9 | 7.2 | | | Ge 3.0 | 1915–2105 |
| 64 | 53.1 | 35.4 | 7.1 | | | Ge 4.4 | 1865–2073 |
| 65 | 53.6 | 35.7 | 8.9 | | | Si 1.8 | 1900–2015 |
| 66 | 53.1 | 35.4 | 8.8 | | | Si 2.7 | 1810–1960 |
| 67 | 54.8 | 36.5 | 7.3 | | | Si 1.4 | 1870–2060 |
| 68 | 54.5 | 36.4 | 7.3 | | | Si 1.8 | 1860–2020 |
| 69 | 58.0 | 38.5 | | | | Ga 3.5 | 2100–2210 |
| 70 | 55.8 | 37.0 | | | | Ga 7.2 | 1935–2150 |
| 71 | 54.8 | 36.3 | | | | Ga 8.9 | 1935–2125 |
| 72 | 56.5 | 37.7 | | | | Ga 5.8 | 1950–2155 |
| 73 | 54.9 | 36.6 | | | | Ga 8.5 | 1930–2130 |
| 74 | 53.4 | 35.6 | | | | Ga 11.0 | 1930–2110 |

Examples 1–23 show the melting ranges that are produced by the addition of varying amounts of silver alone to the palladium-nickel base composition.

Example 24–32 show the melting ranges that are produced by the addition of varying amounts of tin as the sole additive to the palladium-nickel mixture.

Examples 33–48 show the melting ranges that are produced by the addition of varying combined amounts of both silver and tin to the palladium-nickel mixture.

Examples 49–54 show the melting ranges that are produced by the addition of varying amounts of indium to the palladium-nickel mixture as the sole ingredient, as a partial replacement for silver in a palladium-nickel-silver alloy, and as an additive to a palladium-nickel-silver-tin base alloy.

Example 55 shows the melting range that is produced by the addition of 9.6% gold to a palladium-nickel-silver-tin base alloy.

Examples 56–59 show the melting ranges that are produced by the addition of varying amounts of gallium to a palladium-nickel-silver base alloy composition.

Examples 60–64 show the melting ranges that are produced by the addition of varying amounts of germanium to a palladium-nickel-silver containing base alloy.

Examples 65–68 show the melting ranges that are produced by the addition of varying amounts of silicon to a palladium-nickel-silver containing base metal alloy.

Examples 69–74 show the melting ranges that are produced by the addition of varying amounts of gallium to a palladium-nickel base alloy composition wherein the gallium is essentially the sole additive.

The alloy according to this invention should contain a palladium to nickel ratio by weight of no less than 0.9:1 and no greater than 3.0:1 in order to obtain a sufficiently low melting point. The preferred palladium to nickel ratio is about 1.5:1.

The minimum amount of palladium required according to this invention is about 39%. When less than 39% is used, the melting range of the resulting alloy is increased beyond the useful limit. The maximum acceptable amount of palladium is preferably limited to about 60% due to economic considerations and to insure a sufficiently low melting range.

Likewise, the effective amount of nickel required for the alloy of this invention is in the range of 20%–47.5%. At amounts above or below this range, the melting point of the resulting alloy is substantially increased beyond a useful limit.

In order to obtain a brazing alloy having the required melting range, it is necessary to take proper precautions to insure that the amount of impurities present in the alloy is kept to a minimum. In addition to the required elements outlined above, various trace amounts of optional, known additive elements selected from several categories may be present in the brazing alloy according to this invention. For example, known deoxidizers such as lithium, aluminum, boron, silicon, manganese, indium, etc. may be added to the alloy to remove unwanted oxygen or oxides. Lithium is the preferred deoxidizer and may be added in trace amounts up to a maximum of 1%. However, it is preferred that the amount of lithium utilized be 0.5% or less. The other deoxidizers mentioned above may likewise be added in similar minor amounts.

Other known additives such as grain refiners, namely boron, rhenium, ruthenium, rhodium, iridium and zirconium, etc. may be added to produce and maintain grain size. These additives may be present in the alloy composition in an amount up to 1% by weight but preferably will be limited to less than 0.1% of the final brazing alloy composition.

When the soldering composition of the present invention is used for dental restorations and the like, the use of a proper flux is most important, and of course proper soldering procedures are necessary. The following technic is recommended for obtaining best results.

(1) The units to be soldered are placed in an approved high heat investment or soldering investment. (Special liquids for mixing should not be used as they produce chemical setting expansion.) The joint gap distance should approximate 0.3 mm. Best results are obtained when the walls of the joint area are parallel.

(2) The material used to hold units in place is boiled off and while still warm a small amount of suitable flux is placed in the joint. In carrying out the present invention, WILLIAMS HIGH FUSING BONDAL FLUX was used. This flux prevents excessive oxide development when further heat is applied. The solder patty is placed in an oven and the temperature is raised slowly to 800° F. (425° C.) until all residue is eliminated. The patty is then removed from the oven and allowed to cool. A light abrasive sand paper disc or strip is then run through the joint to eliminate possible oxides developed during the burn-off cycle. The joint is then fluxed lightly.

(3) A suitable gas-oxygen torch with a suggested number 2 tip is used to preheat the solder according to this invention in strip form to a dull red color. The solder is dipped in flux and reheated in the flame until a light "glass-like" cover is produced. Such pre-fluxing will aid in preventing the solder from oxidizing when introduced into the hot joint later.

(4) A hot, steady flame is introduced into the joint area using a small circular motion with the torch to provide even heat to both units being soldered. It is crucial that this motion is not interrupted. The technician should be prepared to complete the solder joint before starting this procedure. The circular heating motion is continued until flux is observed to liquify and spread throughout the joint.

(5) When both units to be joined are the same color (bright red), the pre-fluxed solder strip is introduced straight down into the joint. This procedure allows for the introduction of a small amount of cold metal for the flame to heat and produces a smoother action for completion.

(6) The circular heating motion is slowly ceased. When the solder starts to melt, it is gradually fed into the hot joint until completely filled, maintaining a steady flame concentration at the joint area.

(7) The solder strip is then removed and approximately five seconds is allowed to elapse before the flame is removed. The soldered unit is permitted to bench cool before handling.

Where porcelain is to be applied to the dental restoration after soldering, this is done according to standard procedures well known in the art. One or typically several porcelain firing or baking cycles with temperatures up to about 1800° F. may be applied to the soldered dental restoration using the brazing alloy according to this invention without weakening the soldered joint.

The high temperature brazing alloy of the present invention retains the corrosion resistance properties found in the nickel-chromium base alloys which it is used to join and possesses strength properties and a melting range compatible with both the parent alloy and available porcelain products. The brazing alloy of the present invention does not cause discoloration of the porcelain and does not sag when heated to porcelain baking temperatures.

It is therefore apparent that the present invention accomplishes its intended objects. While the present invention has been described in detail for use in dental applications, this is for the purpose of illustration only and not limitation.

What is claimed is:

1. A brazing alloy for joining chromium containing base metal alloys, said brazing alloy having sufficient strength and corrosion resistance to withstand subsequent heating to temperatures up to about 1800° F. without undergoing any significant distortion or sagging, consisting essentially of the following constituents in the indicated percentages by weight: palladium about 39%–60%, nickel about 20%–47.5% and at least one element selected from the group consisting of silver 0–35%, tin 0–32%, indium 0–32% and gallium 0–11%; and optionally containing one or more elements selected from the group consisting of gold 0–10%, germanium 0–4.4% and silicon 0–2.9%.

2. A brazing alloy according to claim 1 consisting essentially of the following constituents in the indicated percentages by weight: palladium about 39%–60%, nickel about 20%–47.5%, silver about 4.8%–35% and at least one additional element selected from the group consisting of tin 0–31.6%, indium 0–18.7% and gallium 0–11%; and optionally one or more elements selected from the group consisting of gold 0–10%, germanium 0–4.4% and silicon 0–2.9%.

3. A brazing alloy according to claim 1 or 2, consisting essentially of the following constituents in the indicated persentages by weight: palladium about 39%–60%, nickel about 20%–47.5%, silver about 3.2%–35% and tin 0.3%–31.6% wherein the total of said silver and tin is at least 3.5%.

4. A brazing alloy according to claim 1 consisting essentially of the following constituents in the indicated precentages by weight: palladium about 53.5%, nickel about 35.6%, silver about 7.1%, tin about 3.8% and lithium about 0.025%.

5. A brazing alloy according to claim 1 consisting essentially of the following constituents in the indicated percentages by weight: palladium about 39%–60%, nickel about 20%–47.5%, silver about 4.8%–35% and optionally one or more elements selected from the group consisting of tin 0–31.6%, indium 0–18.7%, gallium 0–11%, gold 0–10%, germanium 0–4.4% and silicon 0–2.9%.

6. A brazing alloy according to claim 1 consisting essentially of the following constituents in the indicated percentages by weight: palladium about 39%–60%, nickel about 20%–47.5% and silver about 4.8%–35%.

7. A brazing alloy according to claim 1 consisting essentially of the following constituents in the indicated percentages by weight: palladium about 39%–60%, nickel about 20%–47.5% and tin about 4.4%–31.6%.

8. A brazing alloy according to claim 1 consisting essentially of the following constituents in the indicated percentages by weight: palladium about 39%–60%, nickel about 20%–47.5% and indium about 6%–18.7%.

9. A brazing alloy according to claim 1 consisting essentially of the following constituents in the indicated percentages by weight: palladium about 39%–60%, nickel about 20%–47.5% and gallium about 3.5%–11%.

10. A brazing alloy according to claim 1 which is suitable for having porcelain fired thereon.

11. A brazing alloy according to claim 10 which contains about 0.025% of a known deoxidizer.

12. A brazing alloy according to claim 11 wherein the deoxidizer is lithium.

* * * * *